Dec. 28, 1926.
B. H. BLAIR
VEHICLE SPRING
Filed July 31, 1924
1,612,413
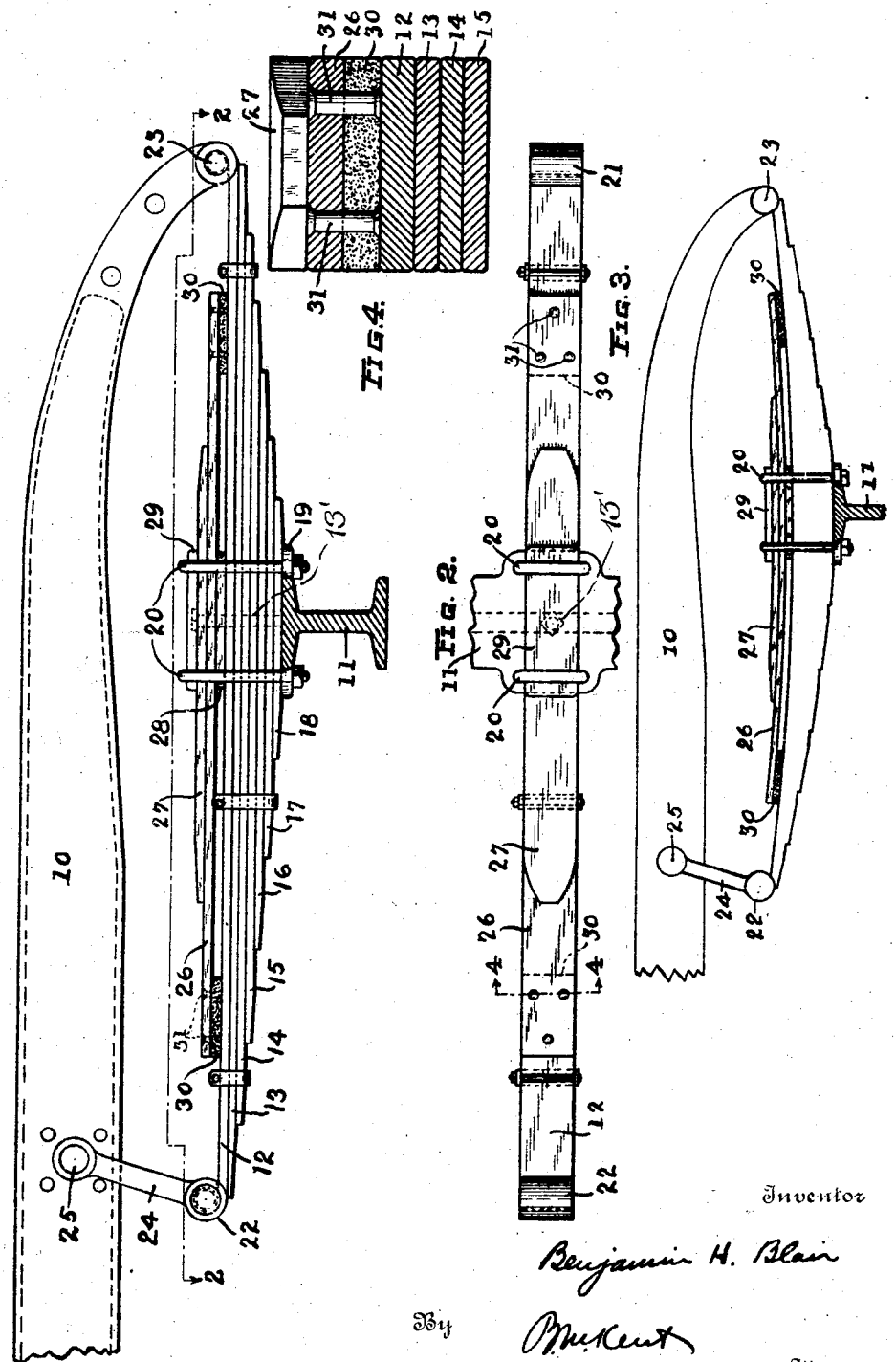
Inventor
Benjamin H. Blair
By
Attorney Patented Dec. 28, 1926.

1,612,413

UNITED STATES PATENT OFFICE.

BENJAMIN H. BLAIR, OF CLEVELAND, OHIO, ASSIGNOR TO THE EATON AXLE AND SPRING COMPANY, OF CLEVELAND, OHIO, A CORPORATION OF OHIO.

VEHICLE SPRING.

Application filed July 31, 1924. Serial No. 729,206.

This invention relates to vehicle springs and more particularly to multiple leaf springs and means for checking excessive rebound movements.

It is one of the objects of the invention to provide a comparatively simple means for checking the rebound, that may be made out of the usual spring plates from which the main spring is made and by the same manufacturing equipment and sold either with the main spring or as a separate unit.

A further object of the invention is to provide a rebound check that will not be noisy in its operation and which will be durable and in no wise affect the normal action of the main spring.

Other objects and the features of novelty will be apparent from the following description, taken in connection with the accompanying drawings, of which:

Figure 1 is a side elevation of a fragment of a motor vehicle frame with my invention applied thereto, the axle being shown in section;

Fig. 2 is a plan view of the spring shown in Fig. 1 as seen from the line 2—2 of Fig. 1;

Fig. 3 is a view similar to Fig. 1, on a smaller scale, and showing the action of the rebound check spring when the main spring rebounds beyond the normal loaded position; and Fig. 4 is an enlarged section on the line 4—4 of Fig. 2.

Referring to the drawings, 10 indicates one of the side members of a motor vehicle frame and 11 an axle. A multiple leaf spring, of ordinary construction, and comprising the main plate 12 and the reinforcing plates 13, 14, 15, 16, 17 and 18, held together by the usual center bolt 13', is clamped on the spring seat 19 of the axle by the usual U-bolts or clips 20. The ends of the main plate are provided with eyes 21 and 22, according to the usual custom, and the eye 21 is pivoted to the end of the frame 10, as indicated at 23. The eye 22 is pivoted to a shackle 24, in the usual manner, and the latter is pivoted to the frame 10, as indicated at 25.

In the operation of a motor vehicle that is provided with multiple leaf springs an excessive rebound results after an abnormal deflection of the spring, such as would occur in going over a bump in the road. In Fig. 1, the main spring is shown in the normal loaded position and, in order to check the rebound of the spring beyond this normal loaded position, I provide a spring comprising the leaves 26 and 27 which are preferably made from ordinary spring plates such as are used in making the main spring. The plate 26 is arranged directly above the main plate 12 and preferably spaced from the latter, over the axle, by a spacing plate 28. The usual plate 29 is provided on the plate 27 and the U-bolts 20 cooperate with this plate and clamp the springs onto the axle, as will be clearly understood from Fig. 1.

According to the usual practice, the axle 11 and plate 29 are provided with recesses for the head and nut of the bolt 13', an example of this arrangement being the center bolt 8 of the Thiemer Patent No. 1,329,642, dated February 3, 1920.

At the ends of the plate 26 I provide pads 30, of friction material, such as is commonly used for lining motor vehicle brakes, and these pads are secured to the plate 26 by rivets 31, or in any other suitable manner.

With the parts arranged as shown in Fig. 1, the rebound spring, comprising the plates 26 and 27, should not exert any pressure on the main spring in the normal loaded position of the latter. The pads 30 should, under these conditions, just touch the main plate 12 and the plates 26 and 27 should be so made as to effect this result.

When there is an excessive rebound of the main spring, such as is indicated by the position of this spring in Fig. 3, the rebound spring will be brought into action abruptly and noiselessly when the main spring, on its rebound movement, passes the normal position shown in Fig. 1. In the deflection of the main spring, preceding the rebound movement, the main leaf 12 will separate from the pads 30 so that the rebound spring will have no effect on the normal deflections of the main spring. On the rebound movement of the main spring, however, the main plate 12 will again pick up or engage the pads 30 when the spring reaches the position shown in Fig. 1, and from this point on, during the rebound movement, the rebound spring will exert gradually increasing pressure upon the main spring and thus serve to check the extent of movement of the latter. On account of using the pads 30, of friction material, there will be no sound emitted, when the main plate 12 strikes the pads, on the rebound movement, and the pads will acentuate the checking action of the rebound spring through frictional engagement with the main plate 12 and because of their sliding action thereon.

It will be evident from the drawings that the rebound spring may be sold with the main spring or may be readily applied to a main spring that is in use by simply providing longer U-bolts 20 and a spacing plate 18. The main spring is not disturbed in any way, either as to its installation or its action, by the addition of the rebound spring.

Having thus described my invention, what I claim is:

1. In vehicle springs, in combination with a multiple-leaf spring, a rebound-check spring arranged on the main leaf of said multiple-leaf spring and comprising a leaf spaced throughout its length from said main leaf, there being pads between the ends of said leaf of the rebound spring and said main leaf which cause the rebound spring to cooperate with the main leaf so as to offer a gradually increasing resistance to rebound movements of the latter past the normal loaded position.

2. In vehicle springs, in combination with a multiple-leaf spring, a rebound-check spring arranged on the main leaf of said multiple-leaf spring and comprising a leaf spaced throughout its length from said main leaf and provided with pads of friction material on its ends adapted to engage the main leaf and bring the rebound spring into action to offer a gradually increasing resistance to rebound movements past the normal loaded position of the multiple-leaf spring.

3. In vehicle springs, in combination with a main multiple-leaf spring, a multiple-leaf rebound-check spring cooperating therewith, a spacer between said springs at their center whereby the rebound-check spring is prevented from affecting movements of the main spring except rebound movements past the normal loaded position, the main leaf of the rebound-check spring being provided with pads of friction material adapted to engage the main leaf of the main spring on such rebound movements and thus bring the rebound-check spring into action abruptly and noiselessly.

In testimony whereof I affix my signature.

BENJAMIN H. BLAIR.